United States Patent [19]

Russell

[11] 4,371,663
[45] Feb. 1, 1983

[54] PHYSICALLY-AMELIORATED STYRENE POLYMER/THERMOPLASTIC ELASTOMER POLYBLENDS

[75] Inventor: Robert J. Russell, Midland, Mich.

[73] Assignee: The Dow Chemical Company, Midland, Mich.

[21] Appl. No.: 99,177

[22] Filed: Nov. 30, 1979

[51] Int. Cl.$^3$ ............................................. C08L 53/00
[52] U.S. Cl. ......................................... 525/95; 525/70; 525/71; 525/72; 525/75; 525/76; 525/77; 525/78; 525/80; 525/81; 525/82; 525/88; 525/93; 525/94; 525/97
[58] Field of Search ..................... 525/70, 71, 72, 88, 525/93, 94, 76, 95, 97, 98, 96, 75, 78, 80, 77, 81, 82

[56] References Cited

U.S. PATENT DOCUMENTS

3,591,537  7/1971  Squire et al. ..................... 525/98

Primary Examiner—J. Ziegler
Attorney, Agent, or Firm—R. B. Ingraham

[57] ABSTRACT

Several important features and characteristics, particularly and pronouncedly environmental stress crack resistance (i.e., "ESCR") as well as other desirable physical properties of blends or intimate admixtures, known as "polyblends" and usually made by melt-blending, of various styrene polymers (i.e., "SP's"), notably homopolystyrene (i.e., "PS"), and thermoplastic elastomers (i.e., "TE's") are significantly and in emphasized measure enhanced by thorough incorporation in (and simultaneous or subsequent heat action-initiating and crosslink-effecting of) the SP/TE polyblend in low level concentration(s) of a thermally-activatable, organic peroxide in combination with any one (or even a mixture) of an optimizing cross-linking supplement provided in effectively reactive amounts of, for illustration, either a styrene (or the like alkenyl aromatic) monomer or a reagent that is reactive towards alkenes (such as certain dithiols, amino-derivatives, etc.) or certain decomposable-type reagents (such as hexachlorothene). Besides noteworthy improvement in ESCR, the tensile strength (including tensile yield—i.e., "$T_y$" and tensile rupture—i.e., "$T_r$"), elongation (i.e., "% Elong.") and practical toughness (as measured by Gardner Impact Strength values) are among the significant physical properties thus ameliorated in the SP/TE polyblends.

25 Claims, 2 Drawing Figures

PHYSICALLY-AMELIORATED STYRENE POLYMER/THERMOPLASTIC ELASTOMER POLYBLENDS

BACKGROUND OF THE INVENTION

While generally useful on their own inherent merits, the physical properties of styrene polymer/thermoplastic elastomer (i.e., SP/TE) polyblend systems are considerably improved when an optimum level of cross-linking is achieved in the elastomeric constituent (i.e., "rubber" or rubbery portion) of the TE. This is particularly advantageous and practical when the SP constitutent of the SP/TE polyblend is general purpose (homo)-polystyrene (i.e., "GP-PS").

The SP's employed are generally polymers and copolymers of alkenyl aromatic monomers of the Formula:

$$CH_2=CGAr,  \quad (I)$$

wherein G is selected from the group consisting of hydrogen and methyl and Ar is an aromatic radical, including various alkyl and halo-ring-substituted aromatic units of from 6 to 10 carbon atoms. Styrene (i.e., "St") is ordinarily the most advantageous and oftentimes preferred species of the Formula (I) monomers to utilize. Others that are frequently quite satisfactory include: α-methyl styrene (i.e., "MeSt"); vinyl toluene (i.e., "VT"); vinyl naphthalene (i.e., "VNPth"); the dimethyl styrenes (i.e., "diMeSt's"), t-butyl styrene (i.e., "t-BuSt"); the several chlorostyrenes (such as the mono- and dichloro-variants—i.e., "ClSt" and "diClSt"); the several bromostyrenes (such as the mono- and dibromo-varients—i.e., "BrSt" and "diBrSt"); and so forth.

Copolymeric SP's can be copolymerizates of one or more Formula (I) monomers, particularly St, with one (or even mixtures) of other addition-polymerizable monoethylenically unsaturated comonomers that are copolymerizable with St including, by way of illustration and not limitation; acrylonitrile (i.e., "VCN") and methacrylonitrile; vinyl chloride (i.e., "VCl") and other vinyl halides; vinylidene chloride (i.e., "VeCl"); acrylic acid (i.e., "HAcr") and its addition-polymerizable esters; methacrylic acid (i.e., "HMeAcr") and its addition-polymerizable esters; various vinyl organic esters such as vinyl acetate, vinyl propionate, etc.; and so forth.

The SP's utilized may also be the rubber-modified interpolymerized products of graftable pre-formed elastomers and monomers of the Formula (I). Typical of these are the so-called high impact polystyrenes (i.e., "HIPS"). When use is made for the SP's of rubber-modified, impact grade plastics products, it is customary for them to be prepared by incorporation in the composition of from, say, 1-20 wt. percent, of an unsaturated, graft-copolymerizable stock of natural or synthetic rubbery elastomers (as hereinafter more fully described) for interpolymerization with the monoethylenically-unsaturated monomer in the reaction mass; all according to established procedures. The modifying rubber in current vogue is polybutadiene or a polybutadiene derivative; although, if desired, natural rubbers may be employed as may styrene/butadiene polymers (as, for example, of the well-known "GRS"-type), polyether elastomers, etc.

It is of general good advantage when copolymeric SP's are employed for at least about 60 percent by weight (i.e., "wt. %"), based on copolymer weight, of Formula (I) monomer(s) that are copolymerizable with St to be copolymerized in the polymer molecule. More advantageously, this is at least about 80 wt. percent, with the balance of copolymerized ingredients being desired comonomer(s) that are copolymerizable with St.

An almost invariable and desirable characteristic of TE's is their inherent combination of the natural flexibility and impact resistance of rubbers with the normally-usual strength and easy-processability of thermoplastics, coupled with features of frictional properties and hardness that are generally intermediate those of conventional rubbers and thermoplastics.

Generally, the TE's may be characterized as "rubbery (or elastomeric) "block" copolymers which, sometimes, are even in at least approximate if not actual "graft" copolymer form. They are, insofar as concerns the presently-contemplated SP/TE polyblends, various sorts and arrangements of a "rubbery" or "elastomeric" center or other possible "backbone" or "substrate" constituent (i.e., and "EL") to and upon which are attached the end or otherwise connected "blocks" of interpolymerized SP (i.e., "IPSP") units. In all cases, in order for an adequate inherent potential for cross-linkability to therein exist, the TE's that are utilized must contain and exhibit a greater or lesser extent or degree of unsaturation therein.

Most, if not literally all, of the presently known varieties of TE's are made by ionic, generally anionic, solution polymerization using an organometallic catalyst, such as sec.-butyl-lithium, n-butyl-lithium or the like or equivalent catalysts, as explained in Reference Number 12 (i.e., "Ref. 12") in the following "LISTING OF REFERENCES" Section of this Specification. Refs. 1 and 2 also deal with this.

Typical architecture(s) of TE's are represented by the Structures:

$$IPSP-(EL)_n-IPSP; \quad (S\ I)$$

(S II)

(S III)

(S IV)

(S V)

and even,
IPSP—EL.  (S VI)

and so on and so forth, all wherein "n" is an integer which, usually, is 1 but can alternatively depend in numerical value on the particular molecular weight (generally a weight average measurement—i.e., "Mw") or chain length of given interconnected EL units in the instances when they are ultimately so joined or formed.

Structure (S I) is quite common, being represented by that commercial variety available from "THE GENERAL TIRE AND RUBBER COMPANY" made from PS and polybutadiene (i.e., "PBu") in the block copolymer form IPSP-PBu-IPSP containing about 40 weight percent PS and having a Mw of about 550,000 (Ref. 6). Structures (S III) through (S V), inclusive, are at least by analogy more or less in the nature of graft copolymers. Structures (S IV) and (S V) are often times referred to as "star-blocks" or "radial-blocks". A good example of a Structure (S V) star-block is that obtainable under the trade-designation "SOLPRENE ®", as described in Ref. 9. This is a radial block (IPSP)$_4$-PBu of varying IPSP:PBu ratio and composition in differing Mw products. "KRATON G ®" is explained in Refs. 10 and 11 and typifies a commercially available Structure (I) material which is a IPPS (hydrogenated)-PBu-IPPS triblock of varying IPPS:PBu ratio, composition (including mineral oil—i.e. "MO"—content) and $M_w$. Structure (S VI) diblock copolymers often have what is referred to as a "tapered" interpolymerized construction of varying $M_w$ and IPSP:PBu ratio.

The EL blocks, often referred to as being the "soft" ones in IPSP/EL interpolymers, provide the rubbery properties to the interpolymer. The IPSP blocks, often referred to as being the "hard" ones in the subject interpolymers, tend to associate or conglomerate into glassy domains. These effectively function as "cross-links", at least insofar as restricting the free movement of the macromolecular TE chains is concerned. The IPSP blocks also give the IPSP/EL product at least the bulk of its tensile strength. The IPSP block domains tend to disappear when softened by heat; re-forming when the interpolymer product is cooled. This, advantageously, allows processing and fabrication of the material according to the various techniques and procedures customarily followed for normal thermoplastics.

Frequently, the overall ratio of "hard" IPSP blocks to "soft" EL blocks in the TE structure is about 2:1 by respective chain(s) proportion reckoning. This is particularly so in strictly and somewhat classic types of "block" copolymers represented by the Structure (S I) and the more or less "graft" styles represented by Structures (S II) and (S III). It may also apply to many SP/TE interpolymers of the (S IV), (S V) and even (S VI) Structures. Useful IPSP/EL materials can be comprised of as little as about 20–25 weight percent or so of the EL constituent. Often, however, this EL content may be on the order of at least 45–50 weight percent and even greater.

The EL utilized for preparation of the TE's may be selected from a wide variety of generally sulfur-vulcanizable materials. It can, for example, be natural rubber (otherwise known as *Hevea Brasiliensis*). Much more often, however, it is a conjugated diolefine (homo)-polymer synthetic rubber (or elastomeric inter-, or co-polymer composition of between about 25 and about 90 weight percent) of a 1,3-diene of the Formula:

$$H_2C:CR\text{---}CH:CH_2, \tag{II}$$

wherein R is selected from the group consisting of hydrogen, chlorine and methyl radicals.

Such conjugated diolefine polymer synthetic rubbers are polymers of: butadienes-1,3, e.g., butadiene-1,3; isoprene; 2,3-dimethylbutadiene-1,3; and copolymers of mixtures thereof; and copolymers of mixtures of one or more such butadienes-1,3, for example, of up to 75 weight percent of such mixtures of one or more mono-ethylenic compounds which contain a (IIA)

grouping, wherein at least one of the disconnected valences is attached to an electronegative group, that is, a group which substantially increases the electrical dis-symmetry or polar character of the molecule.

Examples of compounds which contain the Formula (IIA) grouping and are copolymerizable with butadienes-1,3 are: the Formula (I) monomers, especially St; the unsaturated carboxylic acids and their esters, nitriles and amides, such as acrylic acid, methyl acrylate, ethyl acrylate, methyl methacrylate, acrylonitrile, methacrylonitrile, methacrylamide; vinylpyridines, such as 2-vinylpyridine, 2-methyl-5-vinylpyridine; methyl vinyl ketone, and methyl isopropenyl ketone—all of which besides those above mentioned in connection with the SP's are also compolymerizable with St.

Examples of such conjugated diolefine polymer synthetic rubbers of polybutadiene, polyisoprene, butadiene/styrene copolymers (i.e., "SBR") and butadiene/acrylonitrile copolymers. The synthetic rubber may be solution-prepared or emulsion-prepared, be it a stereo-specific variety or otherwise.

Other conventional unsaturated sulfur-vulcanizable rubbers may also be used as the EL constituent, such as "EPDM" (rubbery terpolymer of ethylene, propylene and a copolymerizable non-conjugated diene such as 1,4-hexadiene, dicyclopentadiene, dicyclooctadine, methylenenorbornene, ethylidenenorbornene, tetrahydroindene, etc.). The analogous fluorocarbon, silicone and polysulfide rubbers may also be employed as an EL.

The SP/TE polyblends may be diblends, triblends or even blends of a greater number of constituents, including, polyblend mixtures of one or more suitable TE's. Broadly speaking, the SP/TE polyblends may be comprised of between about 40 and about 95 weight percent of the SP constituent. More often, however, the SP content ranges from about 50–85 weight percent, with polyblends wherein the proportion of SP is in the neighborhood of 80 weight percent being frequently preferred.

There are several known and heretofore disclosed and, to varying extents, employed to cross-link and/or improve the physical properties of SP/TE polyblend systems. These, all quite diversified but ordinarily and usually without significant modification(s) reasonably adaptable to ordinary blend processing (often involving melt conditions) procedures, include:

(1) The use of processing temperature (heat with oxygen, as from air, present) to effect cross-linking the EL in the polyblend system. The amount of cross-linking is affected by the mechanical temperature, (speed generally in revolutions per minute, i.e., "RPM") of the mixing heads and mixing time (i.e., "MT"). In this technique, the following generalities are observable:

Increase of processing temperature→Increased cross-linking

Increase and mixing rate (or RPM)→Increased cross-linking

Increase of mixing time→Increased cross-linking (2) Using peroxide catalysts to cross-link the EL and improving blend properties. Cumene hydroperoxide (i.e., "CHP"); 1,1 bis(t-butyl peroxy)cyclohexane (i.e., "TBPC"); and t-butyl hydroperoxide (i.e., "TBHP") are effective for this. This sort of technology is disclosed in Refs. 3, 4, and 5.

(3) Another known means is the use of beta radiation (as from an electron beam source) to cross-link the EL. This treatment of the prepared resin improves physical properties of the polyblend and appears optimum at about ½ megarad (i.e., "MRAD") dosage(s).

Nonetheless, nothing in prior art appears to realistically concern itself with an improved and highly effective means and composing technique for greatly enhancing the important physical properties, especially the ESCR characteristics, by cross-linking effects in SP/TE polyblends to get better and more satisfactory products thereby and as a result thereof in the way so indigenously advantageous as in the present contribution to the art.

LISTING OF REFERENCES

| Ref. No. | Identification |
|---|---|
| (1) | U.S. Pat. No. 3,322,734 (R. W. Rees); |
| (2) | U.S. Pat. No. 3,404,134 (R. W. Rees); |
| (3) | U.S. Pat. No. 3,429,951 (C. W. Childers); |
| (4) | U.S. Pat. No. 3,476,829 (J. T. Gruver and C. W. Childers); |
| (5) | U.S. Pat. No. 3,499,949 (C. W. Childers and J. T. Gruver); |
| (6) | R. R. Durst, R. M. Griffith, A. J. Urbanic and W. J. Vanessen of the Research and Development Division of THE GENERAL TIRE AND RUBBER COMPANY in a paper presented at the 168th National Meeting for the 1974, September 8-13, of the AMERICAN CHEMICAL SOCIETY; |
| (7) | H. L. Morris, "Thermoplastic Elastomers" at pp. 103-104 of MODERN PLASTICS ENCYCLOPEDIA (1976-1977); |
| (8) | J. A. Radosta, "Improving The Physical Properties of Impact Polystyrene" at pp. 28-30 of PLASTICS ENGINEERING (September, 1977); |
| (9) | "Modification of Polystyrene with SOLPRENE (Reg. TM) Plastomers", PHILLIPS CHEMICAL COMPANY Publication, TR-17; |
| (10) | "KRATON (Reg. TM) Rubber Products Brochure", SHELL CHEMICAL COMPANY (March, 1977); and |
| (11) | "Shell KRATON (Reg. TM) Rubber For Modification of Thermoplastics", Technical Bulletin No. SC:165-177, SHELL CHEMICAL COMPANY (february, 1977); and |

Other references of possible interest (with capsulated descriptions of their contained subject matter disclosures) include:

| | |
|---|---|
| (12) | U.S. Pat. No. 2,537,951—Treating styrene copolymers with minor amounts of diallyl maleate, divinyl benzene, etc., to give so-called "popcorn" polymers; |
| (13) | U.S. Pat. No. 2,665,270—Involves copolymers of styrene/divinyl benzene/ethyl vinyl benzene; |
| (14) | U.S. Pat. No. 2,668,806—Same as 2,665,270; |
| (15) | U.S. Pat. No. 3,781,382—Concerns making of an impact vinyl aromatic . . . by mass polymerizing until 2-15 percent conversion of monomer . . . with at least one monovinyl aromatic compound having dissolved therein at least one rubbery diene . . . etc.; |
| (16) | U.S. Pat. No. 3,912,703—methods of increasing and decreasing molecular weights of internally unsaturated polymers . . . via use of olefins of lower molecular weight and a disproportionation catalyst; |
| (17) | J5/1066385 from DERWENT's Plasdoc-Vinyl aromatics are continuously polymerized without gelation in the presence of an inhibitor and small amounts of divinyl benzene; |
| (18) | CA 53:31h—Concerns preparation of copolymers of divinyl benzene and styrene in a solvent to control gelation; and |
| (19) | Ca 53:8691h—Concerns radiation polymerization of styrene/divinylbenzene copolymers to improve product strength of resulting styrene polymer. |

Further possible-interest References of other than United States origin include:

| | |
|---|---|
| (20) | Belgian 805,589—Hexahalogenated cyclopentadiene is employed to treat butadiene/styrene polymers for molecular weight increase. |
| (21) | Russian 328,105—Relates to use of divinyl benzene as a viscosity regenerator in the copolymerization of styrenes; |
| (22) | Russian 328,106—Relates to copolymers of alpha-chloromethyl styrene and diisopropylbenzene; |
| (23) | Russian 472,133—Concerns use of divinyl benzene as a cross-linking agent for styrene copolymers; |
| (24) | German 1,092,204—Deals with cross-linked copolymers of styrene and divinyl benzene; |
| (25) | CA 44:5151f—As to copolymerization of styrene/divinyl benzene; |
| (26) | CA 50:16175e—Touches on a styrene/divinyl benzene polymerization system; |
| (27) | CA 46:10667i—Prescribes viscosity-molecular weight conditions for butadiene/styrene divinyl benzene systems; |
| (28) | CA 46:7816h—Studies cross-linking in styrene/divinyl benzene systems with small quantities therein of the difunctional monomer; |
| (29) | CA 32:3049$^5$—Compares styrene cross-linked with divinyl benzene with other cross-linking agents; |
| (30) | CA 39:5153$^9$—As to polymer swelling with such compositions as copolymers of styrene and divinyl benzene; and |
| (31) | CA 84:136114g—Involving gelation in the anionic polymerization of divinyl benzene and styrene. |

FIELD AND PURVIEW OF THE INVENTION

The present invention concerns significantly physically-ameliorated SP/TE polyblends, of a more desirable and useful nature and applicability particularly as regards their excellent capabilities and characteristics with respect to outstanding ESCR qualities, which are advantageously composed so as to optimumly cross-link to the most efficacious property-influencing under the influence of heat at elevated temperature(s), as in the course of melt-processing operations, using for the purpose combinations of low-level concentrations of organic peroxides with any one or more of several cross-linking agent supplements combined with the peroxide in effectively reactive amounts of the supplemental agents in intimate admixture in and with the SP/TE polyblend; including shaped and fabricated articles and products therefrom.

The achievement and provision of all indicated are amongst the principle aims and objectives of the invention; with even more and additionally other benefits and advantages derivable in and from present practice appearing and becoming more evident in the ensuing description and specification.

SUMMARY OF THE INVENTION

The present invention, and the discovery on which it is based, broadly pertains to highly improved, advantageous and novel, optimumly cross-linked SP/TE polyblends having unusually good and extraordinarily desirable ESCR capabilities and characteristics, all in pursuance with and as is in broadest, basic outline set forth and delineated in the following first claim herein which is here reiterated and incorporated by reference.

ILLUSTRATED EXEMPLIFICATION OF THE INVENTION

The invention is additionally demonstrated in and by the graphical portrayals and reproductions of the several FIGURES in the accompanying drawing as they are individually mentioned, explained and to be taken in conjunction with the specification that follows.

PARTICULARIZED DESCRIPTION OF THE INVENTION

The present invention, in basic essence and substance, involves physically-ameliorated SP/TE polyblends, especially those wherein the SP is PS (more particularly GP-PS) and the TE is a "block"- or even "graft"-type-interpolymer of an SP, advantageously PS, and PBu as the EL. These are advantageously the ultimately-obtained, optimumly cross-linked product(s) achieved during melt-processing procedures, as in running of the appropriate compositions through an extruder or in a post-extrusion blending operation (or by utilization of other suitable heat-applying means according to particular fabricating techniques involved). In this connection when devolatizing extruders or equivalent or analogous apparatus is employed, it is preferable for the additive, cross-link-promoting components to be incorporated in the SP/TE polyblend after devolatilization.

The double-component cross-link-promoting additive combinations employed in practice of the present invention are those composed as follows, namely:

(A). First, a thermally-activatable, peroxy oxygen-containing organic peroxide which is miscible in and with the SP/TE polyblend systems being treated and which has in its general structure at least one of the characterizing peroxy oxygen units or linkages of the Formula:

—O—O—, (III)

wherein the entire organic peroxide contains from 2 to about 30 carbon atoms in its general structure.

In this connection, while the characteristic Formula (III) peroxy oxygen unit can and does occur almost anywhere intermediate in linkage disposition in the organic peroxide molecule, it is frequently beneficial to utilize one wherein said peroxy oxygen linkage is towards one of the terminating ends of the molecule in connection with a molecule-completing lower alkyl unit such as tertiary butyl (i.e., "t-Bu") or methyl (i.e., "Me"), as respectively illustrated by "—O—O—tBu" and "—O—O—Me".

Typical, and quite advantageously employed, of such Formula (III) peroxides are CHP, TBPC and TBHP. CHP, a frequently utilized high temperature catalyst has a one-hour half-life at 190° C.; while TBPC, a lower temperature catalyst material, has a lower temperature one-hour half-life at 118° C. Examples of other utilizable peroxides include such compounds as dihydroxyethyl peroxide as well as many other like and analogous peroxides those disclosed from Column 4, line 54, to Column 5, line 36, of Ref. 3, and the like(s) or equivalent(s) thereof.

It is generally advantageous for the peroxides that are utilized to be decomposable at temperatures not too substantially less than about 120° C. (say, more than at least 100° C. or so). The upper permissable and usually desirable decomposition should, without danger of polyblend degradation, be such that substantially occurs during preparation of the optimumly cross-linked SP/TE polyblend compositions pursuant to the present invention. Of course, the degradation temperature of any given polyblend is readily ascertainable by routine procedure(s).

The Formula (III) peroxides are employed in an amount, based on parts per million (i.e., "ppm") by weight of total composition weight, that is between about 50 and about 1,000 ppm, advantageously from about 75–500 ppm and quite frequently in the neighborhood of 100 ppm.

An important feature and benefit of their utilization is the realizable reduction in heat history required to secure cross-linking of the SP/TE polyblend improved. Also, many of them can be conveniently employed and added in liquid solution or dispersion form provided non-interfering solvents or dispersants are employed for the purpose.

Thus, CHP and TBPC can be put up as, say 25 weight percent solutions in ethylbenzene (i.e., "EtBZ") for addition during the SP/TE polyblend processing.

(B) And, secondly, a compound or material that is inter-reactive with the EL in the SP/TE polyblend(s), particularly with added benefit of the Formula (III) peroxy ingredient, that is selected from the Group consisting of:

(B1) Any one or more mixtures of the Formula (I) alkenyl aromatic monomers, particularly St, incorporated in the composition in an amount between about 0.5 and about 3 weight percent (B2) Any one or more of a sterically-hindered and decomposable-type catalyst of the general Formula:

wherein each Z is an independently-chosen radical containing from 1 to about 12 carbon atoms selected from the group consisting of alkyl, cycloalkyl, aryl and alkyl-, cycloalcyl- and aryl-substituted derivatives; and each X is an independently-chosen "bulky" sterically large, space-occupying radical selected from the group consisting of halo- (i.e., fluro-, chloro, bromo- and -iodo), methyl, cyclohexyl, and phenyl.

In this connection, the necessity for X to be of a "bulky" nature in its axial connection to the central carbon atoms in the Formula (IV) structure is to provide for an attribute in the decomposable type catalyst the necessarily positive and effective hindrance factor which lends the desired "decomposability" feature to the material.

Typical and more specific of Formula (IV) materials are 3,4-dimethyl-3,4-diphenyl hexane; 2,3-dimethyl-2,3-diphenyl butane; hexachlorethane (i.e., "HXClEt"); etc.; incorporated in an amount between 100 and about 5,000 ppm. advantageously from about 500 to about 2,000 ppm and frequently on the order of 1,000 ppm.

Speaking still more generally and characterizingly, the Formula (IV) materials are chemical reagents which will tend to decompose or rearrange under processing temperatures and initiate EL cross-links via free radical generation, all according to mechanisms presumably functioning as follows:

(B2-a) For 2,3-dimethyl-2,3-diphenyl butane:

(Principle Intermediate); and

(B2-b). For HXClEt:

(Principle Intermediate).

(B3) Any one or more of a reagent or reagent mixture reactive towards alkenes of the Formula (II) type, such as Bu, including diols and other polyols, diamines, dithiols, tetrathiols, and dicarboxylic acids of the respective general Formulae:

(V-A)
(diol)

(V-B)
(diamine)

(V-C)
(dithiol)

(V-D)
(tetrathiol)

(V-E)
(dicarboxylic acid)

wherein R is any divalent (for formulas V-A, V-B and V-C) or tetravalent (for V-D and V-E) hydrocarbon unit containing from 1 to about 20 carbon atoms selected from the group consisting of alkylene, substituted alkylene, cycloalkylene, substituted cycloalkylene, divalent aromatic and substituted divalent aromatics.

Typifications of suitable Formulae (V-A) through (V-E) materials more specifically include: polyoxypropylenediamines (such as "JEFFAMINE D-2000®" which is one of $M_w$ 2,000); tetra 2-mercaptopropionyl oxy methane, $(HSCH_2CH_2COO)_4C$ oxalic acid, malonic acid, succinic acid, glutaric acid, pimelic acid and so forth, any and all (including their mixtures) of said Formula (V-A) through (V-E) materials being incorporated in the same proportional ranges and range levels as the Formula (IV) materials.

The above-noted (B3) materials also include any one or more of the polyalkylene oxide fumarates, maleates, succineates, and so forth which form in cross-linked networks when polymerized with Formula (I) monomers, particularly St, via a tranesterification mechanism, including, more specifically, a hydroxylated propylene oxide maleate of the Formula:

(V-F)

These materials and as is evident, are actually polyols. They are usually obtained in mixtures containing up to 90 weight percent of an alkylated ester form of the polyol using a lower alkyl, such as methyl, butyl, t-Bu, etc., for the alkylation. A typical alkylated ester derivative (hereinafter identified as "P-1400") found in the usual mixture in which such complex polyols are obtained is one in which the hydroxyl group on the left-hand side of the above Formula(VI-F) is replaced by an n-butyl (i.e., "n-$C_4H_9$") radical. The alkyl- or other substituted polyols, like the polyalkoxides of the following Formula (VI-J), tend to have a beneficial plasticizing function in the resulting polymer compositions in which they are incorporated.

(B4) Any one or more of a reagent or reagent mixture reactive towards Formula (II)-type alkenes including those which are generally "divinyl-" and/or "diisopropenyl-" and/or "diallyl-" in nature and are of general structure according to one or another of the Formulae:

L—B—L, (VI-A)
(dialkenyl aromatic)

wherein each L is independently selected from the group consisting of vinyl, isopropenyl and allyl and B is a divalent aromatic nucleus, including alkyl-, cycloalkyl- and aryl-substituted derivatives thereof, containing from 6 to about 14 carbon atoms; (such as, but not restricted to: divinyl benzene, i.e., "DVB" diisopropenyl benzene, i.e., "D iso-Pr B"; and diisopropenyl toluene, i.e., "D iso-PrT");

(VI-B)

(VI-C)

(VI-D)
, and/or

(VI-E)

wherein each Q is independently selected from the group of organic radicals $R_1$, $R_2$ and $R_3$ in which $R_1$ is an aliphatic (including cycloaliphatic) unit containing from 1 to about 12 carbon atoms and $R_2$ and/or $R_3$ is an aromatic, including substituted aromatic, unit containing from 6 to 12 carbon atoms; plus diacrylates, dimethacrylates, dimaleates and difumarates of the respective Formulae:

(diacrylate) (VI-F)

(dimethacrylate) (VI-G)

(dimaleate) (VI-H)

(difumarate) (VI-I)

in each of which Q is as above defined and x and y, independently, are integers having values between 1 and about 100; as well as polyalkoxides of the Formula:

(VI-J)

in which x is an integer as above defined.

As is the case with the above-named Formula (V-F) polyols, it is also equally interesting (and sometimes of particular coincidental benefit) that, when higher molecular weight difunctional monomers of the Formulae (VI-B) through (VI-J) are employed, unreacted residues thereof are frequently capable of advantageous functioning as plasticizers and/or lubricants for the resulting beneficiated polymer compositions in which they are contained. These are usually incorporated in the same proportional ranges as the Formula (I) monomer additives as set forth in Part (B1) above.

The PS/TE polyblend and the above-specified double-component peroxide-containing, cross-link-promoting additive combination(s) can, as indicated, be mixed or blended in any conventional or desired manner (taking care to avoid escape of volatile inter-reactive compounds amongst those disclosed in Part (B) above before the cross-linking at elevated temperature levels occurs). As also mentioned, thorough and intimate mixing of all ingredients should be done.

It sometimes seems beneficial to exclude air during mixing when the Formula (III) peroxide is present in order to have utmost enhancing property improvement results realized. However, absolute air exclusion is apparently not mandatory. Thus, satisfactory results can usually be obtained when compositional mixing is done in a Banbury apparatus if it is merely only substantially full.

For most purposes, practically any efficient internal mixing equipment can be employed including, besides Banbury-types: twin screw and other varieties of extruders (which may or may not be of the devolatilizing varieties); Brabender Plastograph units and analogous interdigitating gear-like or toothed-wheel devices; compounding and masticating rolls and mills (especially if adequate air exclusion is associated therewith); and the like and so forth. If desired, the mixing can be performed in vacuum or in an inert atmosphere, such as is provided by nitrogen blanketing.

Also, various mixing sequences can be followed. Thus, it is possible to add at first only a portion of either the SP or the TE or both, to be used followed by one or more charge completions later in the mixing cycle. Often, at least in commercial production operations, all of the TE component and a portion of the SP component to be used are put into a first mixing cycle, after which in a second mixing cycle there are charged the remainder of all ingredients and components, including the balance of the SP component and cross-link-promoting additive combinations.

While the mixing temperature employed when the Formula (III) peroxides are present must be sufficiently elevated to at least substantially decompose the peroxide material, the most commonly utilized mixing temperatures fall within the approximate 120°–320° C. range; this more frequently being between about 180° C. and about 260° C. As with the mixing temperature, the particular mixing time expended may vary widely. Generally, it is in a span of between about 1 and 30 or so minutes; with this more often covering a period of from about 2 to about 10 minutes. The PS/TE blends can also be heated to similar temperatures after mixing is terminated. Or, the heating operation can continue for a total period wherein the mixing cycle and a period following termination of the mixing are thereby overlapped.

If not simultaneously mixed and directly fabricated into desired shaped article forms, as in injection or extrusion molding operations, the optimumly cross-linked SP/TE polyblends of the present invention can be converted to granular, pelletized or even powder form for subsequent use and fabrication.

The SP/TE polyblends pursuant to this invention can, if desired or required, be provided with and contain other additaments that are oftentimes included in such compositions, such as, by way of illustration: antioxidants; pigments; dyes; fillers (both pulverulent, particulate or fibrous); stabilizers; mineral oil; and other plasticizers; blowing agents; and so forth.

As is evident and will be apparent to those skilled in the art, the finally-obtained physical properties and other characteristics of the SP/TE polyblends provided by practice of the present invention depend to greater or lesser extents, as can occur or be altered in and with given compositions, of both the particular types of: SP employed (including such factors as $M_w$, presence or absence of various additives, etc.); and/or TE utilized (including such factors as $M_w$, architectural structure, precise composition, the involved IPPS:EL ratio, etc.). A literal myriad of designable product variation and possibilities, with differing advantageous end use capabilities of adaptabilities, are obtainable by apt componential and compositional selection(s) pursuant to the instantly-disclosed practice(s).

TESTING PROCEDURES

In order for suitable, convenient and reliable results and observations to be obtained with embodiments both within and without the scope of the present invention, two different test procedures were utilized. One was in the manner of small scale (or micro-testing) evaluations which generally employed the compositions to be tested in 50 gram, or closely so, quantities. The other was on a larger scale involving 1,200 gram, or closely so, batches. The specifics of the analogous, but differently quantified, procedures were as follows:

"Test M"—(Micro-Scale Procedure)

A Brabender Plastograph was employed. Multiple compositions were usually prepared, generally in a relatively short period of time, and subjected to the micro-testing technique under evaluation.

The actual small scale testing of each testing was performed according to the following steps:

(i) Blending Preparation

1. A GP-PS (invariably one of the "STYRON®" homopolystyrenes available from THE DOW CHEMICAL COMPANY was added in an about 40 gram quantity to the mixing chamber of the Brabender Plastograph and allowed to fuse.

2. When fused, about 10 grams of the TE was added to the chamber and allowed to mix for two minutes (six minutes when no other additives were employed).

3. The cross-link-promoting additive combinations, including the peroxy oxygen material of the Formula (III), were then added and allowed to further mix for four minutes.

4. The SP/TE was then removed from the mixing head, allowed to cool, and ground on a Wiley Mill.

(ii) Physical Property Strand Testing of Blends

A micro-technique was employed for testing the physical properties of the involved SP/TE polyblend with a small amount of sample.

The ground polyblend from the Wiley Mill was extruded through a standard Melt Flow Rate (i.e., "MFR") apparatus (Condition "G", 200° C.) while the strands were quenched (for uniform thickness) and collected in a graduated cylinder of cold water. The resultant strands were measured and tested with special rubber grips on an Instron Testing Machine for $T_y$, $T_r$ and % Elong properties. Another special grip holder was used for determining the Strand Impact (i.e., "S.I.") on an Izod impact apparatus. Subsequent diameter corrections were used to normalize the strand size so comparisons to test bar specimens could be made. Standard tests to determine gel percentages (i.e., "% Gel") and swelling index (i.e., "Swell") were utilized.

(iii) Obtained Results

To verify the validity and agreement of the "Test M" Procedure, some unadulterated and non-blended samples of a PBu-modified high impact PS (i.e., "HIPS") and a TE of the (S VI) structure were stranded and tested for physical properties per "Test M". The HIPS tested was "STYRON 420D" which contains about 5 percent of PBu interpolymerized therein. The rubber has an $M_w$ of about 300,000 and a PS:PBu respective percent ratio of about 30:70, respectively.

The properties were compared to those in the involved product specifications as well as from Izod Test Bar specimens. The comparative results are set forth in the following TABLE I.

TABLE I

"TEST M" VALIDATION

| Product | Property | Product Specification | Test Bar | Strand |
|---|---|---|---|---|
| "STYRON 420D" | $T_y^{(1)}$ | 3650 3300–4000 | 3500 | 3530 |
|  | $T_r^{(1)}$ | 3050 2700–3400 | 2950 | 3000 |
|  | % Elong | 33 20 minimum | 28.5 | 26.0 |
|  | Impact$^{(2)}$ | 1.3 1.0–1.6 | 1.5 | 2.7 |
| "Inter-polymer A" | $T_y^{(1)}$ | 3000 2650–3450 | 2700 | 2650 |
|  | $T_r^{(1)}$ | 2650 2300–3000 | 2500 | 2420 |
|  | % Elong | 45 30 minimum | 35.0 | 37.0 |
|  | Impact$^{(2)}$ | 1.8 1.6 minimum | 1.8 | 4.1 |

$^{(1)}$pounds per square inch (psi)
$^{(2)}$foot pounds per inch (fpi)

As can be seen from TABLE I, the properties of the test bars and strands agreed well (except for Strand Impact (i.e., "S.I.") values and fell within product specifications. S.I. values are approximately 2 to 3 times higher than typical Izod Test Bar values obtained. This is due to the fact that the strand is unnotched and no intended flaw is introduced as in most Test Bar specimens.

"Test Q"-(Larger Quantity Procedure)

For this testing, the SP/TE polyblends were prepared with a Banbury Mixer; then extruded and pelletized on a one-inch NATIONAL RUBBER MACHINERY COMPANY extruder; after which the pelleted polyblends were compression molded for further standard physical property testings.

EXEMPLIFIED LIMITATIONS OF PRIOR ART

Better realization and acute appreciation of the benefits, advantages and surprising and unexpectable results obtained in practice of the present invention come into easier focus and perspective when actual results of the known prior art procedures, as have been indicated in the foregoing, are made as a basis for comparison purposes. To this end, a number of experiments were performed to establish and demonstrate on a common basis the prior art limitation(s) (i.e., "PAL") that exist. These are detailed in the following, wherein (as in all the ensuing reported experimental work—including that in accordance with the present invention set forth in the next sequential Section of this specification entitled "WORKING EXEMPLIFICATION OF THE INVENTION" and unless otherwise indicated all temperature measure(s) are in °C. and weight percents are based on total involved composition weights and more simply designated by the mere symbol "%".

(PAL-1). As has been noted, a classical method for rubber and other EL cross-linking is to introduce thermal energy (i.e., "heat"), generally in production post-processing, to obtain EL cross links in the particular elastomeric or rubber-containing polymeric material so treated. A requirement of this technique is that oxygen ($O_2$), almost invariably from air, be present.

The effect of processing temperature (i.e., "PT"), mixing intensity (reckoned by RPM speed) and minutes of MT per "Test M" were investigated on a PS/TE polyblend of 80% GP-PS having an $M_w$ of about 300,000 ("STYRON 685D") and 20% "SOLPRENE 411" (identified as "Polyblend Diblend Composition X"—i.e., "PB-diX"). The results are as set forth in TABLE II.

TABLE II
EFFECT OF PROCESSING TEMPERATURE, MIXING SPEED AND MIXING TIME ON DIBLEND PHYSICAL PROPERTIES

| PT | RPM | MT | $T_y^{(1)}$ | $T_r^{(1)}$ | % Elong. | S.I.$^{(2)}$ | % Gel | % Swell |
|---|---|---|---|---|---|---|---|---|
| 150° | 60 | 4 | 3180 | 2770 | 9.2 | 16.1 | 9.4 | 13.9 |
| 170° | 60 | 4 | 3530 | 2940 | 16.4 | 17.0 | 13.1 | 15.1 |
| 190° | 60 | 4 | 3690 | 3000 | 21.4 | 12.0 | 16.2 | 17.7 |
| 170° | 60 | 4 | 3530 | 3940 | 16.4 | 17.0 | 13.1 | 15.1 |
| 170° | 80 | 4 | 3700 | 3040 | 21.2 | 18.1 | 16.4 | 17.2 |
| 170° | 100 | 4 | 3670 | 3040 | 25.1 | 10.6 | 18.0 | 18.4 |
| 170° | 60 | 4 | 3530 | 2940 | 16.4 | 17.0 | 13.1 | 15.1 |
| 170° | 60 | 8 | 3810 | 3210 | 16.2 | 17.5 | 13.7 | 15.5 |
| 170° | 80 | 4 | 3700 | 3040 | 21.2 | 18.1 | 16.4 | 17.2 |
| 170° | 80 | 8 | 3890 | 3470 | 22.5 | 12.5 | 16.2 | 18.7 |
| 170° | 100 | 4 | 3670 | 3040 | 25.1 | 10.6 | 18.0 | 18.4 |
| 170° | 100 | 8 | 4120 | 3560 | 24.5 | 11.7 | 18.2 | 19.6 |
| 190° | 60 | 4 | 3690 | 3000 | 21.4 | 12.0 | 16.2 | 17.7 |
| 190° | 60 | 8 | 3730 | 3170 | 19.4 | 8.9 | 16.5 | 17.9 |

$^{(1)}$psi
$^{(2)}$fpi

As is readily seen in TABLE II, there was a general trend of increased Tensile Strength and % Elong. with increasing PT at the highest PT (190°) and highest mixing speed (100 RPM). At longer MT's, Tensile Strengths were improved while % Elong. and impact strengths dropped or remained the same. It was evident that an increase in cross-linking had taken place at higher PT's and higher mixing speeds.

(PAL-2). Again per "Test M", various peroxides and peroxide levels (without accompanyment of any other cross-link-promoting additament) were evaluated in both: a (1) SP/TE diblend (identified as "Polyblend Diblend Composition Y"—i.e., "PB-diY") of (i) 80% "STYRON 685D" a GP-PS of 300,000 $M_w$ having a $M_w/M_n$ ratio value of 2.3–2.5 and containing, with no other additives, 0.12±0.3% zinc stearate and (ii) 20% "SOLPRENE 411" (a radial St/PBu/St triblock EL containing 30% St and having a 300,000 $M_w$); and (2) a HIPS-containing triblend polyblend (identified as "Polyblend Triblend Composition Z"—i.e., "PB-triZ") literally a PS/HIPS/TE, or 70% "STYRON 685D", 15% PBu-modified "STYRON 420D" HIPS and 15% "SOLPRENE 411".

For purposes of still further comparison the "PB-diX" polyblends were also: tested in blank; and in the absence of peroxide, with yet other additive materials including: monomeric St; a commercially-available dicumyl peroxide (i.e., "Di-CUP-R"); and another commercially-available t-Bu peroxide material (obtained under the trade-designation "VUL-CUP-R") of the structure:

The results are as set forth in the following TABLES III AND IV.

TABLE III
EFFECT OF PEROXIDE CATALYST AND CATALYST LEVEL ON "PB-diY" SYSTEMS

| Catalyst (or Additive) | Catalyst Level | $T_y^{(1)}$ | $T_r^{(1)}$ | % Elong. | S.I.$^{(2)}$ | % Gel | % Swell |
|---|---|---|---|---|---|---|---|
| None | — | 3180 | 2770 | 9.2 | 16.1 | 9.4 | 13.9 |
| CHP | 100 ppm | 3040 | 2750 | 10.4 | 16.5 | 10.2 | 14.0 |
| CHP | 300 ppm | 3270 | 2800 | 19.4 | 17.1 | 15.3 | 15.1 |
| CHP | 500 ppm | 3260 | 2900 | 36.3 | 15.0 | 18.4 | 18.2 |
| CHP | 1000 ppm | 3580 | 3220 | 30.2 | 15.9 | 20.7 | 17.1 |
| CHP | 2000 ppm | 3600 | 3260 | 12.7 | 17.2 | 22.1 | 16.0 |
| TBPC | 200 ppm | 3670 | 2870 | 15.4 | 18.0 | 11.0 | 14.1 |
| TBCP | 500 ppm | 3590 | 2990 | 39.5 | 18.0 | 19.1 | 18.1 |
| TBCP | 1000 ppm | 3640 | 3050 | 9.2 | 19.4 | 23.2 | 16.7 |
| TBHP | 500 ppm | 3290 | 2840 | 28.7 | 9.5 | — | — |
| DI-CUP-R | 500 ppm | 3600 | 3200 | 23.8 | 12.3 | — | — |
| VUL-CUP-R | 500 ppm | 3880 | — | 10.0 | 6.4 | — | — |
| St | 500 ppm | 3490 | 2970 | 16.8 | 12.1 | — | — |

$^{(1)}$psi
$^{(2)}$fpi

TABLE IV
EFFECT OF PEROXIDE CHP CATALYST LEVEL ON "PB-triZ" SYSTEMS

| CHP Catalyst Level | $T_y^{(1)}$ | $T_r^{(1)}$ | % Elong. | S.I.$^{(2)}$ |
|---|---|---|---|---|
| None | 2990 | — | 5.0 | 3.6 |
| 100 ppm | 3500 | 3040 | 12.9 | 10.2 |
| 300 ppm | 3750 | 3210 | 10.8 | 9.3 |
| 500 ppm | 3720 | 3120 | 19.1 | 9.2 |
| 1000 ppm | 3700 | 3230 | 16.2 | 8.5 |
| 2000 ppm | 3800 | 3370 | 11.6 | 7.9 |

$^{(1)}$psi
$^{(2)}$fpi

As can be seen from the tabulated data presented, an optimum catalyst level for CHP total blend weight (20% TE content). Tensile Strengths as well as % Elong. values were improved with peroxide addition, as were subsequent increased cross-linking as indicated by % Gel and Swell measurements. Izod Impact values did not substantially change with peroxide addition.

(PAL-3). Once more using "Test M", finely-tuned electron beam source (beta radiation was employed to cross-link the EL in a SP/TE polyblend system. Various levels of radiation were investigated using the "PB-diX" composition.

The results are shown in TABLE V.

TABLE V

EFFECTS OF BETA RADIATION ON PHYSICAL PROPERTIES OF "PB-diY" SYSTEMS

| Radiation Dosage (MRAD) | $T_y$(1) | $T_r$(1) | % Elong. | S.I.(2) |
|---|---|---|---|---|
| None | 3180 | 2770 | 9.2 | 16.1 |
| 0.1 | 3420 | 2990 | 9.6 | 11.6 |
| 0.5 | 3650 | 2990 | 38.2 | 19.2 |
| 1.0 | 3560 | 2980 | 35.0 | 19.0 |
| 2.0 | 3530 | 2960 | 33.6 | 19.0 |
| 10.0 | 3080 | 2930 | 13.0 | 14.7 |

(1)psi
(2)fpi

As can be seen from TABLE V, Tensile Strengths and % Elong. properties peaked at approximately 0.5 MRAD dosage and were fairly constant through 2.0 MRAD dosage. Of course, electron beam radiation can be applied to polymer granules on-line in production after extrusion and pelletizing in order to cross-link the EL.

WORKING EXEMPLIFICATION OF THE INVENTION

The superiority and value of practice in accordance with the present invention is demonstrated in the following reductions to practice (i.e., "RTP") pursuant thereto using, when done for that purpose and with the exceptions of blank runs, various of the peroxide-containing, cross-link-promoting additive combinations described in the foregoing "PARTICULARIZED DESCRIPTION OF THE INVENTION" Section of this Specification. These included evaluations done, as indicated, by both "Test M" and "Test Q" procedures. Additional tests and comparisons with other materials were also made and hereinafter set forth to further demonstrate the exceptional desirability of the presently-contemplated, novel compositions.

(RTP-1). Monomeric St was investigated by itself and in conjunction with a low level of peroxide as a means of cross-linking the block EL and improving properties in the polyblend system. The peroxide is intended to initiate St monomer, generating free radicals which, in turn, cross-link the EL via low molecular weight PS.

Various levels of St incorporation were also checked to determine optimum region of use. The following tabulated data summarizes the St. monomer cross-linking effect on physical properties.

TABLE VI

St + CHP + "PB-diY" SYSTEMS EVALUATED PER "TEST M"

| MT (min.) | Amt. St (%) | Amt. CHP (ppm) | $T_y$(1) | $T_r$(1) | % Elong. | Izod(2) |
|---|---|---|---|---|---|---|
| 5 | None | None | 3610 | 3300 | 37.8 | 2.6 |
| 3 | None | None | 3570 | 3200 | 17.1 | 3.3 |
| 3 | 1.0 | None | 3440 | 3060 | 10.0 | 2.9 |
| 3 | None | 100 | 3040 | 2750 | 10.4 | 2.9 |
| 3 | 0.1 | 100 | 3590 | 3170 | 16.8 | 3.1 |
| 3 | 0.1 | 500 | 3800 | 3400 | 15.4 | 2.9 |
| 3 | 1.0 | 100 | 3870 | 3500 | 40.6 | 3.3 |
| 3 | 2.0 | 100 | 3410 | 2890 | 19.2 | 2.9 |

(1)psi
(2)fpi

TABLE VII

CATALYST EFFECT ON PROPERTIES OF "PB-diY" POLYBLENDS + St EVALUATED PER "TEST M"

| Amount Additive | $T_y$(1) (psi) | $T_r$(1) (psi) | % Elong. | S.I. ft.lb./in.$^2$ |
|---|---|---|---|---|
| No additives | 3180 | 2770 | 9.2 | 16.1 |
| 500 ppm | 3490 | 2970 | 16.8 | 12.1 |
| 1% | 3440 | 3060 | 10.0 | 14.9 |
| 5% | 3310 | — | 6.0 | 13.3 |
| + 100 ppm | 3040 | 2750 | 10.4 | 16.5 |
| 1% and 100 ppm CHP | 3600 | 2920 | 35.8 | 20.3 |
| 1% + 100 ppm and TBPC | 3490 | 2890 | 38.0 | 18.5 |

(1)psi

TABLE VII very plainly portrays the exceptional benefit of utilizing peroxide catalyst in combination with St for much more pronounced elongation improvements in the SP/TE polyblends.

TABLE VIII

CHP CATALYST EFFECT OF "PB-diY" POLYBLENDS + St EVALUATED PER "TEST Q"

| MT #2 Speed (min.) | Amt. St (%) | Amt. CHP (ppm) | $T_y$(1) | $T_r$(1) | % Elong. | Izod(2) | Gardner Impact (in-lbs) | Swell |
|---|---|---|---|---|---|---|---|---|
| 5 | None | None | 3610 | 3300 | 37.8 | 2.6 | 93 | 15.1 |
| 3 | None | None | 3570 | 3200 | 17.1 | 3.3 | 66 | 27.6 |
| 3 | 1.0 | None | 3440 | 3060 | 10.0 | 2.9 | | 26.2 |
| 3 | None | 100 | 3040 | 2750 | 10.4 | 2.9 | | 13.4 |
| 3 | 0.1 | 100 | 3590 | 3170 | 16.8 | 3.1 | | 17.2 |
| 3 | 0.1 | 500 | 3800 | 3400 | 15.4 | 2.9 | | 14.0 |
| 3 | 1.0 | 100 | 3870 | 3500 | 40.6 | 3.3 | 101 | 10.8 |
| 3 | 2.0 | 100 | 3410 | 2890 | 19.2 | 2.9 | | 9.4 |

(1)psi
(2)fpi

The data clearly shows the effectiveness of monomeric St in conjunction with peroxide in improving properties. It also demonstrates that optimum physical properties for the TABLE VIII polyblend was obtained with 1.0% St and 100 ppm of CHP.

In further conjunction with the evidence in the foregoing TABLES VI, VII and VIII, the peculiar sorts of cross-links obtained in SP/TE polyblends in practice of the present invention appear to impart greater strength and toughness than those obtained by the conventional peroxide cross-linking known and practiced in prior art. Additional support for such view is further evident in the hereinafter produced data brought forth in connection with testings done for Practical Toughness and ESCR.

(RTP-2). The decomposable-type reagents of Formula (IV) were evaluated. Significant improvement in the PS/TE polyblend properties were noted as shown in TABLE IX.

TABLE IX

EFFECT IN "PB-diY" POLYBLENDS WITH DECOMPOSABLE TYPE REAGENTS EVALUATED PER "TEST M"

| Amount Additive | $T_y(1)$ (psi) | $T_r(1)$ (psi) | % Elong. | S.I. ft.lb./in.$^2$ |
|---|---|---|---|---|
| No other additive | 3180 | 2770 | 9.2 | 16.1 |
| + 1000 ppm HXClEt | 3280 | 2920 | 43.7 | 17.2 |
| 1000 ppm "VP-(2,3 dimethyl 2,3 diphenylbutane) | 3640 | 3160 | 19.4 | 18.0 |
| + 1000 ppm VAZO 64 | 3760 | 3170 | 18.3 | 17.1 |
| 1000 ppm "VAZO 64" and 0.5 Electron Beam Radiation | 3740 | 3020 | 32.6 | 17.3 |

(1)psi

HXClEt, whose free radical intermediate is generated by heating as illustrated in the foregoing, was studied at various levels for cross-linking optimization (see TABLE X).

TABLE X

EFFECT IN "PB-diY" POLYBLENDS WITH HXClEt EVALUATED PER "TEST Q"

| MT (min.) | Amt. HXClEt (ppm) | $T_y(1)$ | $T_r(1)$ | % Elong. | Izod(2) | Gardner Impact (in-lbs.) | Swell |
|---|---|---|---|---|---|---|---|
| 5 | None | 3610 | 3300 | 37.8 | 2.6 | 93 | 15.1 |
| 3 | None | 3570 | 17.1 | 3.3 | 66 | 27.6 | |
| 3 | 100 | 3460 | 3170 | 19.5 | 2.9 | 82 | 19.7 |
| 3 | 1000 | 3280 | 2920 | 43.7 | 3.1 | 95 | 15.0 |
| 3 | 1% | 3720 | 3030 | 9.0 | 2.9 | — | — |

(1)psi
(2)fpi

The HXClEt cross-linking agent was shown to be most effective at the 1000 ppm level in optimizing polyblend physical properties.

(RTP-3). As noted, the double bonds in such EL's as contain Bu will react with certain functional groups to produce cross-linking. Chemical reagents such as diols, diamines, dithiols, dicarboxylic acids, etc. of Formula (V) will react with double bonds and act as a link between two PBu segments. Several such reagents were found to be effective in improving physical properties. Tensile Strength, % Elong., and S.I. values were all improved, as shown in TABLE XI.

TABLE XI

EFFECT IN "PB-diY" POLYBLENDS WITH FORMULA (V) REAGENTS REACTIVE TOWARDS ALKENES EVALUATED PER "TEST Q"

| Amount Additive | $T_y(1)$ (psi) | $T_r(1)$ (psi) | % Elong. | S.I. ft.lb./in.$^2$ |
|---|---|---|---|---|
| No additives | 3180 | 2770 | 9.2 | 16.1 |
| 100 ppm CHP | 3040 | 2750 | 10.4 | 16.5 |
| 1000 ppm DVB | 3660 | 2940 | 29.5 | 17.6 |
| + 1% (HSCH$_2$CH$_2$COO)$_4$C | 3820 | 3420 | 36.7 | 17.4 |

TABLE XI-continued

EFFECT IN "PB-diY" POLYBLENDS WITH FORMULA (V) REAGENTS REACTIVE TOWARDS ALKENES EVALUATED PER "TEST Q"

| Amount Additive | $T_y(1)$ (psi) | $T_r(1)$ (psi) | % Elong. | S.I. ft.lb./in.$^2$ |
|---|---|---|---|---|
| and +100 ppm CHP | | | | |
| 1% "JEFFAMINE D-2000" and +100 ppm CHP | 3640 | 3280 | 47.8 | 17.3 |

(1)psi

In addition, "JEFFAMINE D-2000" was further investigated at various levels for its cross-linking potential. The resultant data is shown in TABLE XII.

The data indicates that an optimum level for the diamine cross-linking would occur at a concentration of 0.1–1.0% polyoxypropylene diamine in conjunction with 100 ppm of CHP. Optimum properties in the blend were actually obtained as the diamine concentration approached 1.0%.

TABLE XII

EFFECT IN "PB-diY" POLYBLENDS WITH "JEFFAMINE D-2000" EVALUATED PER "TEST Q"

| MT (min) | Amount "JEFFAMINE" D-2000 | Amt. CHP Catalyst (ppm) | $T_y^{(1)}$ | $T_r^{(1)}$ | % Elong. | Izod$^{(2)}$ | Gardner Impact in-lbs | Swell |
|---|---|---|---|---|---|---|---|---|
| 5 | None | None | 3610 | 3300 | 37.8 | 2.6 | 93 | 15.1 |
| 3 | None | None | 3570 | 3200 | 17.1 | 3.3 | 66 | 27.6 |
| 3 | None | 100 | 3040 | 2750 | 10.4 | 2.9 | | 13.4 |
| 3 | 0.1 | 100 | 3630 | 2510 | 24.1 | 3.4 | 88 | 12.2 |
| 3 | 1.0 | 100 | 3530 | 3330 | 26.0 | 3.4 | 99 | 11.5 |
| 3 | 2.0 | 100 | 3400 | 2900 | 18.6 | 2.9 | | 9.3 |

(1)psi
(2)fpi (RTP-4). To demonstrate Formula (V-F) materials, a hydroxy propyl-containing ester of propylene oxide maleate (identified as "P-1400") was tested. When this polyol is added to a PS/TE diblend system, transesterification with the EL, especially Bu in PBu segments, occurs thus forming a cross-linked system. In one use, the "P-1400" was added to the PS/TE blend directly. In another sample of the same blend, the "P-1400" was mixed separately with the TE block rubber on a roll mill and the EL/diester combination was blended with PS.

Blends were prepared having the physical property profile shown in TABLE XIII.

TABLE XIII

EFFECT IN "PB-diY"POLYBLENDS OF "P-1400 DIESTER" WITHOUT AND WITH PEROXIDE CATALYST EVALUATED ESSENTIALLY PER "TEST Q"

| MT (min) | Amount "P-1400" | Amt. CHP (ppm) | $T_y^{(1)}$ | $T_r^{(1)}$ | % Elong. | Izod[2] |
|---|---|---|---|---|---|---|
| 5 | None | None | 3610 | 3300 | 37.8 | 2.6 |
| 3 | None | None | 3570 | 3200 | 17.1 | 3.3 |
| 3 | None | 100 | 3040 | 2750 | 10.4 | 2.9 |
| 3 | 1% (Added directly) | 100 | 3220 | 2930 | 30.0 | 3.0 |
| 3 | 1% (Added directly) | 100 | 3600 | 3000 | 25.2 | 2.3 |

[1]psi
[2]fpi

The addition of the "P-1400" to cross-link the EL rubber improved the elongation of the blend. However, it did little to improve the Tensile Strength. A drop in Izod Impact was observed when the EL/"P-1400" combination was first blended on the two roll mill. This is due to a drop in the molecular weight of the block elastomer from the additional high shear compounding step.

(RTP-5). To demonstrate the effect of cross-linking on Practical Toughness, several "PB-diY" polyblends that had been cross-linked to varying degrees were injection molded into 2-inch discs (0.108 inch thick) on a Watson-Stillman Injection Molding Machine (450° F., 700 psi). Gardner Impact values were obtained on the specimens using a 5/8 inch die. Besides the "PB-diY" polyblends, there were also tested for further comparison an ABS resin which contains 17% VCN, 6.5% PBu, and the balance St and had an $M_w$ of about 195,000 (the same being obtained from THE DOW CHEMICAL COMPANY under the trade-designation "ABS 213"); plus a Structure (S VI) tapered-block IPPS/PBu TE containing about 43.5% St and 56.5% PBu with an $M_w$ of about 265,000, identified as "TE-S VI". The results were as set forth in the following TABLE XIV.

TABLE XIV

SWELLING INDICES vs CROSS-LINKING TECHNIQUE

| Product | Swell | Cross-linked Via |
|---|---|---|
| "TE-S VI" | 12.5 | Thermal (In Air) |
| "ABS 213" | 15.7 | Thermal (In Air) |
| "PB-diY" | 27.6 | Thermal (In Air) |
| " | 15.1 | Thermal (In Air) |
| " | 12.0 | 100 ppm CHP |
| " | 10.2 | 500 ppm CHP |
| " | 10.8 | 100 ppm CHP + 1% St monomer |
| " | 11.5 | 100 ppm CHP + 1% "JEFFAMINE D-2000" |

The Swelling Index of various cross-linked "PB-diY" samples was also measured by dissolving each of the samples in dimethylformamide and taking absorbance readings on a Brinkman PC/1000 Colorimeter.

Figure 1:
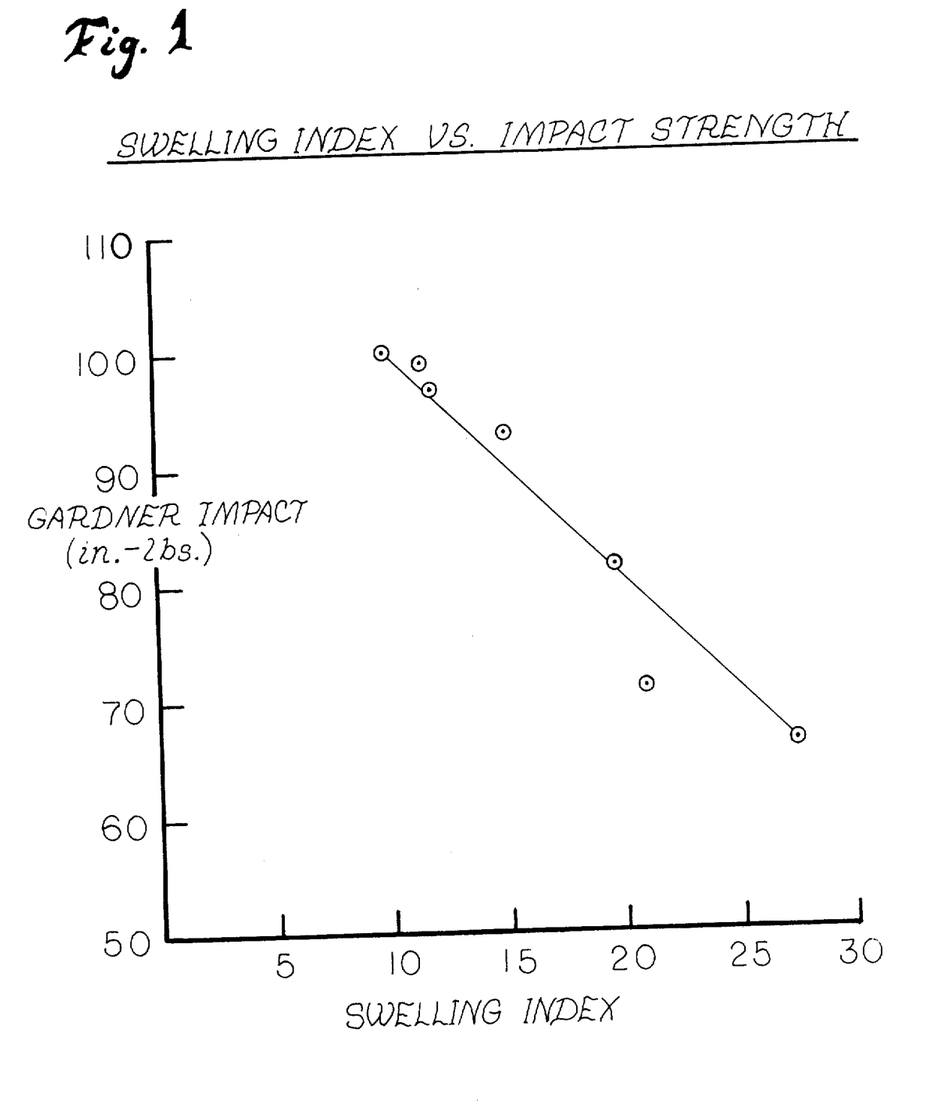

Heat, peroxide catalyst, peroxide catalyst with St monomer, and peroxide catalyst with amine were cross-linking techniques employed on the specimens tested for Practical Toughness. As cross-linking increased (Swelling Index 27.6 to 10.2), Gardner Impact values also increased from 66 to 101 in-lbs. The results are as depicted in FIG. 1 of the accompanying Drawing.

(RTP-6). It cannot be overstressed that resins having greatly improved ESCR resistance characteristics are highly desirable and of increasing importance. On at least an informal basis, a benchmark for good ESCR in resins is by comparison with that of "ABS 213"; those possessing equal or better resistance being considered as at least very good, if not excellent.

Figure 2:
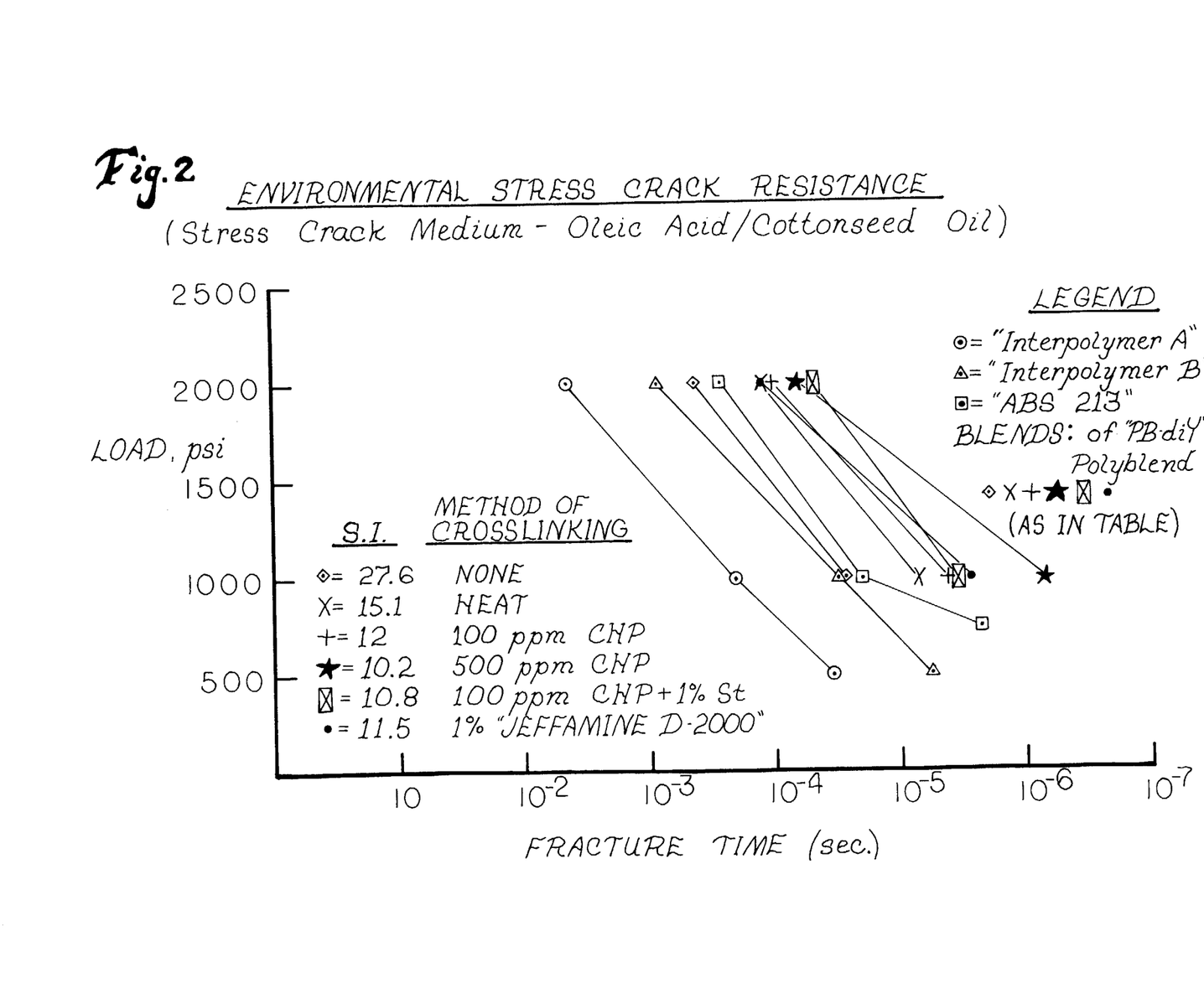

It has been found that a "PB-diY" polyblend (i.e., an 80% "STYRON 685D"/20% "SOLPRENE 411" diblend) meets the ESCR resistance of "ABS 213". By further inducing the proper degree of cross-linking in "PB-diY" polyblends, particularly by practice in accordance with the present invention, highly superior stress crack resistant products were obtained. FIG. 2 of the accompanying Drawing very clearly draws out and shows the results of these tests with various non-cross-linked and cross-linked "PB-diY" polyblends along with, for purposes of comparison, the same tests run on "ABS 213" and two other polymers. One of these, identified as "Interpolymer A", was an about 225,000 $M_w$ HIPS containing a loading of about 7% interpolymerized PBu. The other, identified as "Interpolymer B", was purposely-prepared ESCR high molecular weight HIPS containing about 11.5% PBu with an $M_w$ value in excess of 225,000.

(RTP-7). To illustrate what advantages are obtained in preparing cross-linked polyblends, a comparison to existing HIPS, ABS and other products is shown in TABLES XV and XVI. In this, the results shown in TABLE XV were obtained by evaluation according to "Test M", while "Test Q" was employed to get the data in TABLE XVI.

TABLE XV

PROPERTY COMPARISONS USING "TEST M"

| Product | $T_y^{(1)}$ | $T_r^{(1)}$ | % Elong. | S.I.[2] |
|---|---|---|---|---|
| "STYRON 420D" HIPS | 3530 | 3000 | 26 | 2.7 |
| "Interpolymer A" | 2630 | 2420 | 37 | 4.1 |
| "ABS 213" | 3320 | 3560 | 41.7 | 5.3 |
| "PB-diY" Diblend + 500 ppm CHP | 3300 | 3000 | 37 | 17.0 |
| "PB-triZ-1" Triblend[a] + 500 ppm CHP | 3730 | 3320 | 40.8 | 17.2 |
| 40% "STYRON 685D"[b] + 60% "KRO3" (transparent about 18% rubber content) | 4060 | 3350 | 64.5 | 1.4 |

[a]"KRO3" is a "K-Resin" from PHILLIPS CHEMICAL COMPANY with a diblock PS/PBu interpolymer containing about 25% Bu.
[b]Contains 71% "STYRON 685D"; 10% "STYRON 420D"; and 19% "SOLPRENE 411".
[1]psi
[2]fpi As noted earlier, S.I. values are higher than Izod Impact values obtained from Test Bar specimens. They are, however, valid for sample comparisons. All other properties are not greatly affected by strand testing.

The physical property data in TABLE XV shows that a close parallel in properties to an ABS polymer can be obtained by diblend "PB-diY" and the triblend system "PB-triZ-1". Impact values, however, are considerably higher in the polyblends.

TABLE XVI

PROPERTY COMPARISONS USING "TEST Q"

| Product | $T_y^{(1)}$ | $T_r^{(1)}$ | % Elong. | Izod (fts-lbs) | Gardner Impact (in-lbs) |
|---|---|---|---|---|---|
| "STYRON 420D" HIPS | 3650 | 3050 | 33 | 1.3 | — |
| "Interpolymer A" | 3000 | 2650 | 37 | 1.8 | 65 |

TABLE XVI-continued
PROPERTY COMPARISONS USING "TEST Q"

| Product | $T_y$[1] | $T_r$[1] | % Elong. | Izod (fts-lbs) | Gardner Impact (in-lbs) |
|---|---|---|---|---|---|
| "ABS 213" | 3320 | 3560 | 41.7 | 1.8 | 110 |
| "PB-diY" Polyblend + 500 ppm CHP | 3810 | 3300 | 31.6 | 3.2 | 100 |
| "PB-diY" Polyblend + 100 ppm CHP + 1% St monomer | 3870 | 3500 | 49.6 | 3.3 | 101 |

[1]psi

As is evident in TABLE XVI, the cross-linked diblends exhibit superior Tensile Strengths, Izod Impact strengths, and equivalent elongations to existing HIPS products. As discussed previously, the cross-linked diblends also have superior (up to a twelve-fold improvement) stress crack resistance to HIPS products and "ABS 213", as is demonstrated in FIG. 11.

(RTP-8). To indicate what improvements are expectable by ameliorating the physical properties of various PS/TE polyblends in accordance with the present invention, several SP/TE polyblends were prepared using different EL constituents. Each of the polyblends consisted of 80% GP-PS ("STYRON 685D") with 20% of the particular EL involved.

The EL types included in the testing included: various "SOLPRENE" materials; several "KRATON" TE's; a linear PS/PBu/PS block copolymer obtained as "GRT (TPE)" from the GENERAL TIRE & RUBBER COMPANY containing about 40% IPPS and having a $M_w$ of 550,000; and two PS/PBu diblock copolymers of varying $M_w$ and Ps:PBu ratio, one of which, identified as "EL-C" was a non-tapered diblock containing about 43.5% PS and the balance PBu with an $M_w$ of about 265,000. The other, identified as "EL-D" was tapered diblock containing about 41.7% PS and the balance PBu with about a 97,000 $M_w$ value.

The prepared SP/TE poly(di)blends were cross-linked by mere peroxide addition, using 500 ppm of CHP for each batch prepared. No cross-link-promoting combinations in strict pursuance with the invention were utilized; this being purposefully since demonstrating the properties of the SP/TE polyblends by mere peroxide effect is good indication of the considerably significant prospective improvements to be realized when any of the interreactive components (or mixtures thereof) described in Parts (B1) through (B4), inclusive, described in the foregoing "PARTICULARIZED DESCRIPTION OF THE INVENTION" Section of this Specification are also utilized for optimized cross-linking of the involved polyblends. The results are as set forth in the following TABLE XVII.

TABLE XVII
EFFECTS OF VARIOUS TYPES OF TE's IN PEROXIDE CROSS-LINKED PS/TE POLYBLEND SYSTEMS EVALUATED PER "TEST M"

| TE | $T_y$[1] | $T_r$[1] | % Elong. | S.I.[2] |
|---|---|---|---|---|
| "SOLPRENE 411" | 3260 | 2900 | 36.3 | 15.0 |
| "SOLPRENE 414" | 4040 | 3900 | 19.6 | 7.2 |
| "SOLPRENE 512" | 4430 | brittle | 6.5 | 5.0 |
| "KRATON 1652" | 4760 | brittle | 7.5 | 5.5 |
| "KRATON 2130" | 3750 | 2780 | 24.8 | 9.0 |
| "KRATON 2705" | 2400 | 2120 | 19.8 | 4.9 |
| "GTR (TPE)" | 3260 | 3210 | 33.8 | 9.5 |
| "EL-C" | 4570 | brittle | 9.0 | 8.8 |

TABLE XVII-continued
EFFECTS OF VARIOUS TYPES OF TE's IN PEROXIDE CROSS-LINKED PS/TE POLYBLEND SYSTEMS EVALUATED PER "TEST M"

| TE | $T_y$[1] | $T_r$[1] | % Elong. | S.I.[2] |
|---|---|---|---|---|
| "EL-D" | 4130 | brittle | 7.0 | 14.8 |

[1]psi
[2]fpi (RTP-9). In a way analogous to and for similar purposes involved in the expostulation of the above Part (RTP-8), a transparent, impact PS/TE polyblend was tested and compared with a "PB-diY" sample, all pursuant to "Test M". The transparent material was composed of a diblend of 40% "STYRON 685D" and 60% "K-RESIN KR03", identified as "PB-TRANS". TABLE XVIII sets forth the results of the comparison.

TABLE XVIII
PROPERTY COMPARISON OF "PB-diY" AND "PB-TRANS" EVALUATED PER "TEST M"

| PS/TE | $T_y$[1] | $T_r$[1] | % Elong. | S.I.[2] |
|---|---|---|---|---|
| "PB-diY" | 3180 | 2770 | 9.2 | 16.1 |
| "PB-TRANS" | 4060 | 3350 | 64.5 | 1.4 |

[1]psi
[2]fpi

The transparent composition is quite interesting, with many obviously advantageous applications, especially when optimumly cross-linked in accordance with the present invention. However, a relatively high level of the "K-RESIN" or "K-RESIN"-type or equivalent in the "PB-TRANS" polyblend, usually on the order of 50-60%, is ordinarily needed therein to obtain reasonable impact-like properties in the transparent SP/TE polyblend.

Analogous good results are obtained in providing and obtaining the unique products of the present invention when any or all of the reductions to practice in the foregoing Parts (RTP-1) through (RTP-7) are repeated excepting: to substitute other polymers and copolymers of the Formula (I) monomers for PS, including copolymers of St and other Formula (I) monomers with other comonomers such as VCN, VCl, VeCl, HAcr, HMeAcr, etc.; to do the same insofar as the IPPS "block" and or "graft" constituents are concerned; to utilize other of the disclosed rubbers and rubbery elastomers as to the EL for the TE constituent in place of PBu; and to utilize TE's of any of the different varying architectures represented by Structure (S I) through (S VI) other than those above illustrated; to employ different peroxides of the Formula (III) and different interreactive materials for combination with such peroxides of the Formulae (I), (IV), (V) and (VI); or to make other substitutions and replacement of equivalent materials and ingredients in pursuance with the foregoing disclosure.

Many changes and modifications can readily be made and adapted in specifically altered embodiments in accordance with the present invention without substantially or materially departing from its apparent and intended spirit and scope, all in pursuance and accordance with same as it is set forth and defined in the hereto-appended claims.

What is claimed is:

1. A polyblended composition or polyblend particularly well characterized in having outstanding environmental stress crack resistance comprising, in intimate admixture:
(a) a styrene polymer containing polymerized therein at least about 60 percent by weight, of at least one alkenyl aromatic monomer of the Formula:

$$CH_2=CGAr, \qquad (I)$$

wherein G is selected from the group consisting of hydrogen and methyl and Ar is an aromatic radical, selected from the group consisting of benzene alkyl, and halo-ring-substituted aromatic units of from 6 to about 10 carbon atoms, with any balance of unsaturated material copolymerized with the Formula (I) monomer is said styrene polymer being at least one other ethylenically-unsaturated material that is copolymerizable with styrene; and
(b) a thermoplastic rubbery elastomer block copolymer which is comprised of:
at least one elastomer block of synthetic rubber connected to
at least one styrene polymer block, the styrene polymer of said block being hereinbefore defined;
said thermoplastic rubbery elastomer block copolymer being comprised of at least about 20 weight percent of said elastomer block with the balance being said styrene polymer block;
the styrene polymer and the elastomer block copolymer together containing at least about 40 weight percent of the styrene polymer therein with the balance being said thermoplastic elastomer block copolymer;
(c) between about 50 and about 1,000 parts per million by weight based on total polyblend composition weight of a thermally-activatable, peroxy oxygen-containing organic peroxide which is miscible in and with said styrene polymer and block copolymer which has in its general structure at least one of the characterizing linkage units of the Formula:

$$—O—O—, \qquad (III)$$

wherein the entire organic peroxide contains from 2 to about 30 carbon atoms in its general structure and is thermally decomposable at a temperature in the range that is greater than about 100° C. less than that at which thermal degradation of the involved styrene polymer block copolymer occurs, the peroxy oxygen containing organic peroxide being present in a crosslink promoting effectively reactive quantity
(d) at least one material that is inter-reactive with the rubber elastomer constituent in said styrene polymer block copolymer polyblends under influence of said peroxide, which material is selected from the group consisting of:
(d.1) an alkenyl aromatic monomer of Formula (I) and mixtures thereof incorporated in the polyblend composition in an amount between about 0.5 and about 3 weight percent.

2. A composition in accordance with claim 1, wherein said elastomer block is a conjugated diolefine (homo)polymeric or copolymeric synthetic elastomeric interpolymer of a monomer of the Formula:

$$H_2C:CR—CH:CH_2, \qquad (II)$$

wherein R is selected from the group consisting of hydrogen, chlorine and methyl radicals, with any balance of monomer copolymerized with the Formula (II) 1,3-diene monomer in said elastomer constituent being at least one other ethylenically-unsaturated monomeric material that is addition-copolymerizable with styrene.

3. The composition of claim 2 wherein the elastomer constituent contains at least about 50 weight percent of the polymerized Formula (II) 1,3-diene.

4. The composition of claim 2 wherein the Formula (II) 1,3-diene is butadiene.

5. The composition of claim 2, wherein said elastomer constituent is a copolymer with the balance of monomer that is copolymerized with said Formula (II) 1,3-diene is styrene.

6. A composition in accordance with the composition of claim 1, wherein said elastomer block is polybutadiene.

7. The composition of claim 1, wherein said styrene polymer (a) contains at least about 80 weight percent of said polymerized Formula (I) monomer.

8. The composition of claim 1, wherein said styrene polymer in (a) is homopolystyrene.

9. The composition of claim 1, wherein said interpolymerized styrene polymer is a styrene copolymer.

10. The composition of claim 1, wherein said thermoplastic rubbery elastomer block copolymer contains at least about 50 weight percent of said elastomer constituent.

11. The composition of claim 1, wherein said thermoplastic rubbery elastomer block copolymer in (b) is an interpolymerized styrene polymer-polybutadiene block copolymer.

12. The composition of claim 1, wherein the cross-linkable polyblended styrene polymer-thermoplastic elastomer composition contains at least about 40 weight percent of the styrene polymer constituent.

13. The composition of claim 1, wherein the cross-linkable polyblended styrene polymer-thermoplastic elastomer composition contains at least about 80 weight percent of the styrene polymer constituent.

14. The composition of claim 1 containing from about 75 to about 500 ppm of said Formula (III) peroxide.

15. Cumene hydroperoxide as the Formula (III) peroxide in the composition according to claim 1.

16. Cumene hydroperoxide as the Formula (III) peroxide in the composition according to claim 14.

17. 1,1 bis (t-butyl peroxy) cyclohexane as the Formula (III) peroxide in the composition according to claim 1.

18. 1,1 bis (t-butyl peroxy) cyclohexane as the Formula (III) peroxide in the composition according to claim 14.

19. A t-butyl peroxy as the Formula (III) peroxide in the composition according to claim 1.

20. A t-butyl peroxy as the Formula (III) peroxide in the composition according to claim 14.

21. The composition of claim 1 wherein the inter-reactive Formula (I) material is styrene.

22. A composition in accordance with the composition of claim 21 wherein said styrene is contained in the styrene polymer thermoplastic elastomer polyblend in an amount of about 1 weight percent.

23. A cross-linked styrene polymer-thermoplastic elastomer polyblend product which has been formed by the heating to a peroxy-activating temperature that is at least about 120° C. and not greater than the thermal degradation temperature of the involved polyblend of a composition that is in accordance with the composition of claim 1.

24. A cross-linked styrene polymer-thermoplastic elastomer has been formed by melt processing at a temperature at least equalling the activating temperature of the involved Formula (III) peroxide a composition that is in accordance with the composition of claim 1.

25. A fabricated shaped article prepared from a cross-linked styrene polymer thermoplastic elastomer polyblend product that is in accordance with the product of claim 24.

* * * * *